United States Patent [19]

Kotian

[11] 4,456,654

[45] Jun. 26, 1984

[54] ELECTRICAL CABLE INSULATED WITH AN ELASTOMERIC FLAME RETARDANT COMPOSITION

[75] Inventor: Vijayraj M. Kotian, Stow, Ohio

[73] Assignee: Eaton Corporation, Cleveland, Ohio

[21] Appl. No.: 381,235

[22] Filed: May 24, 1982

[51] Int. Cl.³ .................. B32B 27/00; H01B 7/00
[52] U.S. Cl. ..................... 428/383; 174/120 SR; 428/384; 428/389; 428/390; 428/391
[58] Field of Search ............... 428/375, 379, 384, 383, 428/389, 390, 391; 174/110 PM, 110 F, 120 SR

[56] References Cited

U.S. PATENT DOCUMENTS

| | | | |
|---|---|---|---|
| 2,953,551 | 9/1960 | White | 174/110 PM |
| 3,424,631 | 1/1969 | Peacock | 174/110 PM |
| 3,553,348 | 1/1966 | Betts | 174/110 PM |
| 3,802,913 | 4/1974 | Mackenzie, Jr. | 428/389 |
| 3,922,442 | 11/1975 | North et al. | 428/389 X |
| 4,020,214 | 4/1977 | Mackenzie, Jr. | 428/389 |
| 4,243,579 | 1/1981 | Keogh | 524/433 |
| 4,260,661 | 4/1981 | Walters | 174/110 PM X |
| 4,349,605 | 9/1982 | Biggs et al. | 428/389 |
| 4,370,076 | 1/1983 | Sullivan et al. | 428/389 |

*Primary Examiner*—Lorraine T. Kendell
*Attorney, Agent, or Firm*—C. H. Grace; A. E. Chrow

[57] ABSTRACT

Disclosed are crosslinked elastomeric compositions particularly suitable as a jacketing material for plenum cable. The compositions are based upon a mixture of an elastomeric component comprising an elastomeric copolymer of ethylene and methyl acrylate containing carboxylic crosslinking sites and from about 180 parts to about 350 parts by weight of at least one filler per 100 parts by weight of the elastomeric component to provide a limiting oxygen index of at least about 45 percent. Although the compositions may contain further additives such as processing aids, crosslinking agents, antioxidants, plasticizers and flame retardants, they are able to meet or exceed the flame spread and optical density requirements of Underwriters Laboratories UL 910 Tunnel Flame Test for electrical plenum cable jacketing material without the necessity of containing halogens.

26 Claims, No Drawings

ELECTRICAL CABLE INSULATED WITH AN ELASTOMERIC FLAME RETARDANT COMPOSITION

INTRODUCTION

This invention relates generally to flexible, crosslinkable flame retardant elastomeric compositions and more particularly to flexible, thermoplastically processable, crosslinkable, flame retardant elastomeric compositions based upon a copolymer of ethylene and methyl acrylate containing carboxylic crosslinking sites that in the crosslinked state can be effectively used in articles of manufacture and are particularly useful as a protective jacket for plenum cable.

BACKGROUND OF THE INVENTION

It has been the practice in the past in certain instances to use environmental air ducts and plenums to provide a passageway for electrical cables. The flame retardant characteristics of electrical cables conveyed through such ducts and plenums is necessarily extremely critical particularly with respect to flame proprogation and to the amount of smoke generated by the cable materials when exposed to a flame.

One test for evaluating flame propagation and smoke-generating characteristic of electrical cables for use in ducts and plenums (commonly called "plenum cable") is Underwriters Laboratories Inc., Tunnel Flame Test designated UL 910. The UL 910 Test is used by Underwriter Laboratories as a criterion for determining the suitability of particular cables for use in duct and plenums. The Test involves laying 24 foot lengths of the cable to be tested on supporting racks within the Test chamber and, after following a prescribed calibration procedure, exposing the samples to a 300,000 BTU methane flame for a prescribed period of time while measuring flame propagation and smoke generation in terms of specific optical density in accordance with the test procedures. The Underwriters Laboratories has established that, under the Tunnel Flame Test UL 910, plenum cables must exhibit a smoke characteristic in terms of a peak optional density of 0.5 or less and a maximum flame spread of 5 feet or less.

It is also desirable that the materials from which electrical plenum cable is made contain no halogens such as fluorine or chlorine which are known to generate a variety of toxic gases when heated above certain threshold temperature limits that may well be exceeded in a burning environment.

Up until the time of the present invention, plenum cable has almost exclusively utilized fluoroplastic material such as fluorinated ethylene propylene as a means of providing cable jacketing having low smoke generating characteristics in conjunction with flame retardancy characteristics. Such fluroplastic materials, however, are expensive and contain fluorine which in a burning environment are apt to release a complex series of potentially toxic or corrosive gases that could be conveyed through the ducts and plenums containing the cables.

In view of the above, a need exists for an inexpensive composition having attractive physical and electrical insulating characteristics that is adapted to char when exposed to a flame and is particularly suited for use in plenum cable by generating low smoke while otherwise meeting or exceeding the requirements of Underwriters Laboratories Tunnel Flame Test UL 910 whether or not any halogens are present in the composition.

SUMMARY OF THE INVENTION

Accordingly, it is an object of the present invention to provide inexpensive, flexible, flame retardant elastomeric compositions suitable for use in making articles of manufacture.

It is another object of this invention to provide inexpensive, flexible, thermoplastically processable, crosslinkable, flame retardant compositions that are adapted to char when exposed to a flame without generating large volumes of smoke.

It is a further object of this invention to provide inexpensive, flexible, thermoplastically processable, crosslinkable, flame retardant elastomeric compositions that in the form of a jacket about an electrical cable are able to meet or exceed the requirements of Underwriters Laboratories Tunnel Flame Test UL 910.

It is yet a further object of this invention to provide inexpensive, flexible, flame retardant elastomeric compositions containing no halogens that in the form of a jacket about electrical plenum cable are able to meet or exceed the requirements of Underwriters Laboratories Tunnel Flame Test UL 910.

DESCRIPTION OF THE PREFERRED EMBODIMENT

The compositions of the present invention are based upon inexpensive elastomeric copolymers of ethylene and methyl acrylate having carboxylic crosslinking sites of which our type is sold by the Dupont Company under the Trademark "Vamac". Vamac is presently sold by the Dupont Company in masterbatch form under the trade numbers N-123, B-124 and HGB-124. N-123 is described in Dupont literature as a masterbatch containing 100 parts of an ethylene/acrylic elastomer having carboxylic crosslinking sites and 23 parts of fumed silica, stabilizers and processing aids. B-124 is described in Dupont literature as a masterbatch containing 100 parts of ethylene/acrylic elastomer having carboxylic crosslinking sites and 20 parts of N774 SRF carbon black and 4 parts of stabilizers and processing aids. HGB-124 is described in Dupont literature as a higher viscosity version of B-124. As hereinafter used in both the specification and claims, the term "copolymers of ethylene and methyl acrylate" containing carboxylic crosslinking sites includes such copolymers above and also includes the additional materials contained within the Vamac masterbatches as well as in masterbatches of ethylene methyl acrylate copolymer elastomer containing carboxylic crosslinking sites available from other suppliers.

It has been found that compositions of the invention based upon copolymers of ethylene and methyl acrylate containing carboxylic crosslinking sites such as Vamac can be made that in the form of a jacket about electrical plenum cables are able, even in the absence of halogens, to meet or exceed the requirements of the UL 910 Tunnel Flame Test provided the compositions have a limiting oxygen index under ASTM D2863 of at least about 45 percent. Fluorinated materials presently used for plenum cable jacketing have generally exhibited a limiting oxygen index of 45 percent or higher but were able to limit flame spread under the UL 910 Tunnel Flame Test by blanketing the material with non-flammable fluorocarbon gases evolved during the burning process. In contrast, embodiments of the compositions of the present invention (containing no halogens such as fluorine) give off only various hydrocarbon gases and water during the burning process and yet surprisingly are able to meet or exceed the flame spread and smoke generation requirements of the UL 910 Tunnel Flame Test. Although flame retardant compositions made from Vamac disclosed in Dupont's Bulletin EA-520.2 may be suitable for some purposes, they are not able to provide a material for use as jacketing about plenum cable that is able to limit flame spread to under 5 feet and exhibit peak optical densities of 0.5 or less under the UL 910 Tunnel Flame Test. It has been discovered however, that when copolyers of ethylene and methyl acrylate containing carboxylic crosslinking sites such as Vamac are compounded as hereinafter described to a point where their limiting oxygen index under ASTM D 2863 is at least about 45 percent, they are able to retain attractive physical and electrical characteristics in conjunction with good processability and self-extinguishing characteristics such that, even in the absence of any halogens, they are able to be used in plenum cable by meeting or exceeding the Tunnel Flame Test requirement of UL 910.

Following Table I illustrates formulations leading to the surprising discovery with respect to the compositions of the invention are able to meet or exceed the flame spread and smoke-generating requirements of UL 910 without the necessity of containing halogens.

TABLE I

| | Sample | | | |
|---|---|---|---|---|
| | A | B | C | D |
| Component | (Parts by weight per 100 parts by weight of N-123) | | | |
| Vamac N-123 | 100 | 100 | 100 | 100 |
| Aflas 150E | — | 10 | — | — |
| 932 CM | 210 | 165 | 240 | 260 |
| Dythal | 4.5 | 4.5 | 4.5 | — |
| Vynathene 902-35 | 25 | 1 | 20 | 18 |
| Stearic acid | 1 | 3 | 1 | 1 |
| Santowhite | 3 | 3 | 3 | 3 |
| Paraffin wax | 2 | 2 | 2 | 2 |
| Antimony oxide | — | 5 | — | — |
| PTMEG (2000 MW) | — | — | — | — |
| HVA-2 | 2 | 2 | 2 | 1 |

In above Table I, Vamac N-123 is the natural masterbatch of a copolymer of ethylene and methyl acrylate elastomer containing carboxylic crosslinking sites sold by the Dupont Company. Aflas 150E is a fluorinated elastomer sold by Asahi Glass Company. 932CM is a hydrated alumina coated with a proprietary coupling agent sold by Solem Industries. Dythal is a lead stabilizer available from numerous chemical supply houses. 902-35 is a ethylene-vinyl acetate copolymer sold under the trademark Vynathene by USI. Stearic acid and paraffin wax are processing aids available from numerous chemical supply houses. Santowhite is a hindered phenolic antioxidant sold under the Santowhite trademark by Monsanto Company. PTMEG is 2000 molecular weight Poly (tetramethylene-ether) glycol sold by Upjohn Company. HVA-2 is a N, $N^1$-m-phenylenedimaleimide radiation sensitizing agent sold under the HVA-2 Trademark by the Dupont Company.

Samples A-D in above Table I were milled at about 200° F. and then compression molded at 300° F. at about 3000 psi for three minutes after having been first preheated at about 300° F. for about three minutes.

Following Table II shows the properties determined from the molded slabs after radiation crosslinking the slabs at about 5 to about 8 megarads of high energy electrons.

TABLE II

| Sample Property | ASTM METHOD | A | B | C | D |
|---|---|---|---|---|---|
| Density, gm/cm³ | D 792 | 1.62 | 1.64 | 1.68 | 1.67 |
| Hardness, Shore A, 10 Sec | D 2240 | 88 | 82 | 89 | 83 |
| Tensile Strength, psi | D 638 | 1185 | 1080 | 1211 | 920 |
| 100% Modulus, psi | D 638 | 1310 | 1185 | 1334 | 985 |
| Ultimate elongation, % | D 638 | 175 | 190 | 140 | 135 |
| Thickness of Test Slab, inches | ANSI/ASTM E-662-79 | .125 | .125 | .125 | .125 |
| Limiting oxygen index, % | D 2863 | 41.2 | 42.2 | 48.7 | 58.7 |
| Dm, smoldering | ANSI/ASTM E[1]662-79 | 121 | 175 | 101 | 100 |
| Dm, flaming | ANSI/ASTM E 662-79 | 55 | 46 | 42 | 55 |
| Dm, total | ANSI/ASTM E 662-79 | 176 | 221 | 143 | 155 |
| Air oven aging, days at 121° C. | | | | | |
| Tensile retained, % | ICEA[2] S-19-81 | 189 | 202 | 195 | 200 |
| Elongation retained, % | ICEA S-19-81 | 31 | 30 | 39 | 52 |
| Tear, lb/in | ICEA S-19-81 | 26 | 20 | 26 | 39 |

[1]Combined standard under American Society for Testing Materials (ASTM) and American National Standards Institute (ANSI).
[2]Insulated Cable Engineering Association.

Samples A-B were also extruded about cable and radiation crosslinked with about 5 to about 8 megarads of high energy electrons and the resultant cable subjected to Tunnel Flame Test UL 910 with the results shown in following Table III.

TABLE III

| Sample | A | B | C | D |
|---|---|---|---|---|
| Flame Spread, ft | 7 | 5.5 | 4 | 5 |
| Optical Density[1] | .42 | .51 | .35 | .25 |

[1]Under UL 910, optical density is calculated from the equation $D = \log_{10}(100/T)$ when T equals percent light transmission through a particular portion of the tunnel. Under ANSI/ASTM 662-79, maximum specific density is calculated from the equation $D_m = V/AL \log_{10}(100/T)$ where V equals the test chamber volume, A equals the sample surface area, L equals the length of the light path through the smoke, and T equals the minimum percent light transmission measured during the test.

Samples C and D illustrate, that in order for a composition of the invention based upon a copolymer of ethylene and methyl acrylate containing carboxylic crosslinking sites to meet or exceed the requirements of the UL 910 Tunnel FLame Test, it must have a limiting oxygen index of at least about 45 percent. Such is clearly illustrated by Samples A and B which in Table II have a limiting oxygen index of 41.2 percent and 42.2 percent respectively and, as shown in Table III, are unable to meet or exceed the maximum flame spread limitation of 5 feet under UL 910 by having a flame spread of 7 feet and 5.5 feet, respectively. In contrast, Samples C and D exhibit a limiting oxygen index of 48.7 percent and 58.7 percent respectively which results in a flame spread of 4 feet and 5 feet respectively and an optical density of 0.35 and 0.25 respectively which meets or exceeds the maximum flame spread requirement of 5 feet and 0.5 optical density requirement of UL 910. Note also that the presence of a halogenated material such as the fluorinated Aflas 150 E elastomer of Sample B is no assurance that the composition will meet or exceed the flame spread and smoke generating requirements of UL 910.

The compositions of the invention may be radiation or chemically crosslinked. Although the compositions of the invention may be radiation crosslinked (preferably with high energy electrons) without radiation sensitizing agents it is preferred to include radiation sensitizing agents as a means of enhancing the susceptibility to radiation crosslinking. In Samples A-D the sensitizing agent is N, $N^1$-m-phenylenedimaleimide sold under the Trademark HVA-2 by the Dupont Company. HVA-2 has been found to be particulary effective in enhancing the susceptability of the compositions to crosslinking by high energy electrons. Another example of a radiation sensitizing agent found to be of advantage in crosslinking the compositions of the invention is tetra-ethylene glycol dimethacrylate sold under the trade number SR 209 by Sartomer Company. A further example of a radiation sensitizing agent suitable for use in enhancing the susceptability of the compositions of the invention to radiation crosslinking is trimethylolpropane trimethacrylate sold under Trade number SR 350 by Sartomer Company. Generally, from about 1 part to about 5 parts by weight of such radiation sensitizing agent per 100 parts by weight of the ethylene methyl acrylate elastomeric component of the composition has been found to be effective. An example of a chemical crosslinking agent that may be used in the composition is disclosed by the Dupont company as suitable for crosslinking Vamac by vulcanization is dicumyl peroxide on calcium carbonate sold under the Trademark Dicup 40C by Hercules Incorporated. Examples of other chemical crosslinking agents including organic peroxide compounds such as 2, 5-dimethyl -2, 5, -di (t-butyl peroxy)-hexyne-3 suitable for use in crosslinking compositions of the invention are disclosed in U.S. Pat. No. 4,243,579, the disclosure of which is incorporated herein by reference.

Other examples of the composition of the invention are shown in the following Table IV.

TABLE IV

| Component | Sample | | | |
|---|---|---|---|---|
| | E | F | G | H |
| | (Parts by weight per 100 parts by weight of N-123) | | | |
| Vamac N-123 | 100 | 100 | 100 | 100 |
| Vynathene 902-35 | — | — | 25 | —20 |
| Antioxidant AC | 3 | — | — | — |
| Santowhite | — | 3 | 3 | 3 |
| Hydral 710 | 200 | 160 | 300 | — |
| 932-CM | — | — | — | 250 |
| Aflas 150E | — | 10 | — | — |
| Silane A-172 | 1 | 2 | — | — |
| Dythal | — | 5 | 5 | — |
| stearic acid | 1 | 1 | 1 | 1 |
| CM liquid | — | — | 3 | — |
| Paraffin wax | 2 | 2 | 2 | 2 |
| HVA-2 | — | 2 | 2 | 1 |
| Antimony oxide | — | 5 | — | — |
| PTMEG (2000 MW) | — | — | — | 3 |

In above Table IV, antioxidant AC is a proprietary phenolic antioxidant sold by Sovereign Chemical Company. Hydral 710 is a hydrated alumina sold under the Trademark Hydral by the Aluminum Company of America. Silane A-172 is an organosilane coupling agent sold under the trademark Silane by Union Carbide. Dythal is a lead stabilizer sold under the Trademark Dythal by Associated Lead Company. CM liquid is a proprietary coupling agent sold by Solem Industries. Antimony oxide is a flame retardant synergist available from numerous chemical supply houses.

Samples E-H in above Table IV cover molded and crosslinked by electron radiation in the manner previously described with respect to Samples A-D. Following Table V shows properties determined from samples taken from the crosslinked molded slab form of Samples E-H.

TABLE V

| Property | ASTM METHOD | Sample | | | |
|---|---|---|---|---|---|
| | | E | F | G | H |
| Density, gm/cm$^3$ | D 792 | 1.69 | 1.67 | 1.74 | 1.68 |
| Hardness, Shore A, 10 sec | D 2240 | 81 | 88 | 92 | 81 |
| Tensile Strength, psi | D 638 | 876 | 1215 | 1481 | 900 |
| 100% Modulus, psi | D 638 | 1043 | 1356 | — | 1015 |
| Ultimate elongation, % | D 638 | 167 | 175 | 90 | 145 |
| Limiting oxygen index, % | D 2863 | 62.7 | 47.0 | 60.2 | 56.0 |
| Dm, smoldering | ANSI/ASTM E662-79 | 125 | 108 | 92 | 98 |
| Dm, flaming | ANSI/ASTM E662-79 | 72 | 54 | 41 | 61 |
| Tear Strength, lb/in | ICEA S-19-81 | — | — | — | 53 |
| Brittle Temperature, °C. | ASTM D-746 | — | — | — | −10 |

Sample E illustrates that the composition of the invention can be effectively cured by electrons without the presence of a sensitizing agent. Sample F illustrates that a halogen containing material such as the fluorocarbon containing Aflax 150E can be added without adversely effecting the desired limiting oxygen index. Sample F also illustrates that a synergistic flame retardant agent such as antimony oxide can also be added to the composition when desired. Generally, from about 0.01 part to about 40 parts and preferably from about 5 parts to about 20 parts by weight of antimony oxide may be added per 100 parts by weight of the ethylene methyl acrylate copolymer elastomer component containing carboxylic crosslinking sites. Samples F and G also illustrate that a coupling agent such as A-172 or the CM liquid may be added regardless of whether or not the filler is itself coated with a coupling agent or hydrophobic material. Sample H illustrates that the addition of a hydroxy terminated glycol such as PTMEG provides an attractive cold brittleness temperature while retaining a limiting oxygen index higher than the required 45 percent.

The composition of the invention may contain synergistic flame retardant additives such as antimony oxide and heat stabilizers such as litharge and one or more ethylene-vinyl acetate copolymers or other additives such as colorants, U.V. stabilizers, and the like, provided they do not adversely effect the ability of the compositions to retain attractive physical and electrical insulating properties in conjunction with the ability to meet or exceed the requirements of UL 910. The basic components of the compositions is the combination of (1) an ethylene methyl acrylate copolymer elastomer containing carboxylic crosslinking sites with (2) a filler in conjunction with (3) at least one antioxidant and (4) at least one processing aid compounded together in such amounts as to provide attractive physical and electrical properties in the crosslinked state in conjunction with a limiting oxygen index of at least about 45 percent.

It has been found that in order to impart the composition of the invention with flame retardant characteristics sufficient to meet the maximum flame spread and peak optical density requirements of UL 910, that a higher amount of filler is required than the amount disclosed in Dupont literature for compounding flame retardant compositions from Vamac or in U.S. Pat. No. 4,243,579 for compounding flame retardant alkylene-alkyl acrylate copolymer compositions. Contrary to the teaching by the Dupont company in their Bulletin EA-520.2 that Vamac compounded with greater than 100 parts by weight of alumina burns readily, it has been discovered that from about 180 parts to about 350 parts and preferably from about 200 parts to about 300 parts by weight of a calcium or magnesium oxide, calcium or magnesium carbonate or hydroxide or calcium or magnesium sulfate or silicate or hydrated aluminum per 100 parts by weight of the ethylene methyl acrylate elastomeric copolymer component can provide the amount of flame retardancy required and that such can be added while still retaining attractive physical and electrical properties. Such fillers may optionally be coated with a suitable coupling agent or hydrophobic material such as metallic salts of fatty acids and organosilanes disclosed in U.S. Pat. No. 4,243,579. A filler found to be of particular advantage is hydrated alumina that is coated with a suitable coupling agent such as vinyl silane or the proprietary coated hydrated alumina sold under the Trademark 932 CM by Solem Industries.

Other examples of hydrated alumina found suitable for use with the compositions are hydrated alumina respectively sold under the Tradenames Hydral 710 and C-330 by the Aluminum Company of America.

The compositions of the invention may also include the addition of from about 0.01 part to about 7 parts by weight and preferably from about 0.5 part to about 5 parts by weight of at least one antioxidant per 100 parts by weight of the ethylene methyl acrylate elastomeric component.

Any antioxidant or mixture of antioxidants that are compatible with and do not adversely affect the desired physical and electrical properties nor hinder the ability of the composition to exceed an oxygen index of at least 45 percent may be used. Examples of antioxidants that may be advantageously used are hindered phenolic antioxidants such as sold under the Tradename Snatowhite by Monsanto Company, trifunctional and tetrafunctional type hindered phenolics, dilauryl thiodipropionate and zinc salt of a blend of 4- and 5-methyl mercapto benzimidazole sold under the Tradename Vulkanox ZMB-2 by Mobay Chemical. Other examples of antioxidants which may be used in the compositions are disclosed in U.S. Pat. No. 4,243,579. Such antioxidants may be used singularly or in combination with each other.

The compositions of the invention may also include the addition of from about 0.01 part to about 8 parts and preferably from about 0.5 part to about 5 parts by weight of at least one processing aid per 100 parts by weight of the ethylene methyl acrylate copolymer component containing carboxylic crosslinking sites. Any suitable processing aid or combination or processing aids may be used that are compatible with and do not adversely affect the desired physical and electrical properties nor hinder the ability of the compositions to attain a limiting oxygen index of at least 45 percent. Examples of a combination of processing aids that can be advantageously used is the stearic acid and paraffin wax combination of Samples C and D shown in Table I.

The compositions of the invention may also include from about 0.01 part to about 40 parts and preferably from about 5 parts to about 25 parts by weight of at least one ethylene-vinyl acetate copolymer per 100 parts by weight of the ethylene methyl acrylate copolymer elastomer containing carboxylic crosslinking sites such that the elastomeric component contains an amount of vinyl acetate sufficient to comprise from about 2% to about 20% by weight of the total weight of the elastomeric compound. It has been surprisingly found that compositions of the invention having attractive physical and electrical properties in combination with a limiting oxygen index of at least 45 percent can be made even upon the addition of ethylene-vinyl acetate copolymers which burn readily. The actual amount of the ethylene methyl acrylate copolymer elastomer having carboxylic crosslinking sites and filler and antioxidant and processing aids and crosslinking agent are adjusted accordingly within the ranges indicated for each. Examples of ethylene vinyl acetate copolymers found to be of advantage in making the compositions are sold under the Trademark Elvax 460 and Elvax 560 by the DuPont Company and by USI Chemical under the Trademark Vynathene 902-35 and UE-637.

The compositions may also include from about 0.01 part to about 40 parts and preferably from about 10 parts to about 40 parts of a flame retardant additive provided such additives do not adversely affect the desired physical and electrical properties of the composition nor hinder their ability to possess a limiting oxygen index of at least 45 and their ability to meet or exceed both the flame spread and smoke generation requirement of UL 910. Examples of halogenated flame retardant additions which may be used to advantage include chlorinated, brominated and chlorobrominated additives such as disclosed in U.S. Pat. No. 4,243,579 and in Dupont literature hereinbefore referenced relating to the flame retardant compounding of Vamac. An example of a chlorinated flame retardant additive suitable for use in making compositions of the invention is sold under the trademark Dechlorane Plus by Hooker Chemical. An example of a suitable brominated flame retardant additive is decabromo-biphenyl ether sold by Saytech Incorporated.

The composition may also include from about 0.01 part to about 10 parts and preferably from about 0.5 parts to about 5 parts by weight of a low temperature plasticizer per 100 parts by weight of the ethylene methyl acrylate copolymer elastomeric component containing carboxylic crosslinking sites provided that such plasticizer does not adversely affect the ability of the composition to meet or exceed the requirement of the UL 910 Tunnel Flame Test. An example of low temperature plasticizers found to be of advantage are hydroxy terminated gylcols having a molecular weight of about 1,000 to about 3,000. The 2,000 molecular weight poly (tetramethylene-ether) glycol sold by the Upjohn Company under the trademark Polymeg 2000 is particularly effective for improving the cold temperature properties of the composition of the invention when added at from about 0.5 part to about 5 parts by weight per 100 parts by weight of the ethylene methyl acrylate copolymer elastomer component containing carboxylic crosslinking sites.

Both the radiation and chemically crosslinkable versions of the composition of the invention are thermoplastically processable and may be processed into or as part of an article of manufacture by conventional molding and extrusion techniques provided the temperature of processing the chemical curing version does not exceed the temperature at which the chemical crosslinking agent is activated.

Typically, the chemical crosslinking version of the compositions may be crosslinked by conventional vulcanization techniques subsequent to their having been formed into the shape desired.

Although the compositions are particularly suited for use as jacketing material for plenum cable, they may also be used as primary insulation about individual electrical conductors as well as for any other article of manufacture that are able to utilize the associated properties. A particular plenum cable construction found to be of advantage is where the primary insulation about the one or more individual electrical conductors of the cable is made from a polyimide material such as sold under the Trademark "Ulten" by General Electric Company or an aromatic polyimide such as sold under the Trademark "Kapton" by the Dupont Company and the cable jacket surrounding the insulated conductors is made from the composition of the invention. Another example of the plenum cable found particularly effective is where the primary insulation about the one or more individual electrical conductors of the cable is made from a fluorinated material such as ethylene chlorotrifluoro ethylene sold under the Trademark "Halar" by the Allied Corporation and the cable jacket surrounding the conductors is made from the compositions of the invention.

What is claimed is:

1. An electrical cable comprising at least one electrical conductor having an electrical insulation material disposed thereabout contained within a flexible, low smoke, elastomeric, flame retardant jacket adapted to char when exposed to a flame, said jacket made from a crosslinked composition comprising:
   an elastomeric component comprising a copolymer of ethylene and methyl acrylate containing carboxylic crosslinking sites;
   from about 180 parts to about 350 parts by weight of at least one filler per 100 parts by weight of said elastomeric comonent, said filler selected from the group consisting of calcium silicate, magnesium silicate and hydrated alumina fillers, and
   said composition characterized by having a limiting oxygen index under ASTM D-2863 of at least about 45 percent and having a maximum specific optical density under ANSI/ASTM E 662-79 in a smoldering state of not more than about 160 and in a flaming state of not more than about 80.

2. The cable of claim 1 wherein the conductor insulation material is made from said composition.

3. The cable of claim 1 in the form of a plenum cable wherein the conductor insulation material is selected from the group consisting of polyimide, fluorocarbon and said composition materials, said cable able to meet or exceed the flame propagation and peak optical density requirements of Underwriters Laboratories Tunnel Flame Test UL 910.

4. An electrical cable adapted for use in plenum and ducts and able to meet or exceed the flame propagaton and peak optical density requirements of Underwriters Laboratories Tunnel Flame Test UL 910, said cable comprising at least one electrical conductor having an electrical insulation material disposed thereabout contained within a flexible, low smoke, halogen-free, elastomeric, flame retardant jacket adapted to char when exposed to a flame, said jacket made from a crosslinked composition comprising:
   an elastomeric component comprising an elastomeric copolymer of ethylene and methyl acrylate containing carboxylic crosslinking sites;
   from about 180 parts to about 350 parts by weight of at least one filler per 100 parts by weight of said elastomeric component, said filler selected from the group consisting of calcium silicate, magnesium silicate and hydrated alumina fillers, and
   said composition characterized by having a limiting oxygen index under ASTM D-2863 of at least about 45 percent and having a maximum specific optical density under ANSI/ASTM E 662-79 in a smoldering state of not more than about 160 and in a flaming state of not more than about 80;
   and said insulation material selected from the group consisting of polyimide, fluorocarbon and said composition materials.

5. The cable of claim 1 or 4 wherein the composition includes from about 0.01 part to about 40 parts by weight of an ethylene-vinyl acetate copolymer per 100 parts by weight of the elastomeric component, said copolymer containing an amount of vinyl acetate sufficient to comprise from about 2% to about 20% by weight of the weight of the elastomeric component.

6. The cable of claim 1 or 4 wherein the composition includes from about 0.01 part to about 10 parts by weight per 100 parts by weight of said elastomeric component of a low temperature plasticizer having a molecular weight of about 1,000 to about 3,000.

7. The cable of claim 6 wherein the plasticizer is a hydroxy terminated glycol.

8. The cable of claim 7 wherein the hydroxy terminated glycol is poly (tetramethylene-ether) glycol.

9. The cable of claim 1 or 4 wherein the composition includes from about 0.01 part to about 7 parts by weight of at least one antioxidant per 100 parts by weight of said elastomeric component.

10. The cable of claim 9 wherein the antioxidant is a phenolic antioxidant.

11. The cable of claim 1 or 4 wherein the composition includes from about 0.01 part to about 8 parts by weight of at least one processing aid per 100 parts by weight of said elastomeric component.

12. The cable of claim 11 wherein the processing aid comprises from about 0.01 part to about 5 parts by weight of paraffin wax and from about 0.01 part to about 2 parts by weight of stearic acid per 100 parts by weight of said elastomeric component.

13. The cable of claim 1 wherein the composition includes from about 0.01 part to about 40 parts by weight of a halogenated flame retardant compound per 100 parts by weight of said elastomeric component.

14. The cable of claim 1 or 4 or 13 wherein the composition includes from about 0.01 part to about 40 parts by weight of antimony oxide per 100 parts by weight of said elastomeric component.

15. The cable of claim 1 or 4 wherein the composition includes from about 0.01 part to about 5 parts by weight of a lead stabilizer per 100 parts by weight of said elastomeric component.

16. The cable of claim 1 or 4 wherein at least one of said fillers is coated with a hydrophobic material.

17. The cable of claim 1 or 4 wherein at least one of said fillers is coated with a coupling agent.

18. The cable of claim 17 wherein coupling agent is organosilane.

19. The cable of claim 1 or 4 wherein the composition includes an effective amount of a coupling agent.

20. The cable of claim 19 wherein said coupling agent is organosilane.

21. The cable of claim 1 or 4 wherein the composition includes an effective amount of a crosslinking agent.

22. The cable of claim 21 wherein the crosslinking agent is a radiation sensitizing agent.

23. The cable of claim 22 wherein the sensitizing agent is tetraethylene glycol dimethacrylate.

24. The cable of claim 22 wherein the sensitizing agent is $N_1N$-m-phenylemide-maleimide.

25. The cable of claim 1 or 4 wherein the composition is crosslinked by high energy electron radiation.

26. The plenum cable of claim 4, wherein said conductor is insulated with a fluorinated material.

* * * * *